(12) United States Patent
Farley et al.

(10) Patent No.: US 7,632,182 B2
(45) Date of Patent: Dec. 15, 2009

(54) LOCKING SYSTEM FOR ATTACHING A THRESHING AND/OR SEPARATING ELEMENT TO A ROTOR OF A THRESHING SYSTEM

(75) Inventors: Herbert M. Farley, Elizabethtown, PA (US); Wayne Flickinger, New Providence, PA (US); Mark Luke Nolt, Leola, PA (US); Luke W. Morrie, Lancaster, PA (US); David Michael DeChristopher, Akron, PA (US); F. Jay Eichelberger, Paradise, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/001,102

(22) Filed: Dec. 10, 2007

(65) Prior Publication Data
US 2008/0167100 A1     Jul. 10, 2008

Related U.S. Application Data

(60) Provisional application No. 60/878,817, filed on Jan. 5, 2007, provisional application No. 60/878,823, filed on Jan. 5, 2007.

(51) Int. Cl.
*A01F 12/34* (2006.01)
*A01F 12/00* (2006.01)

(52) U.S. Cl. .......................................... 460/71; 460/122
(58) Field of Classification Search .................. 460/59, 460/71, 72, 109, 110, 121, 122
See application file for complete search history.

(56) References Cited

U.S. PATENT DOCUMENTS

| | | | |
|---|---|---|---|
| 283,529 A | 8/1883 | Stewart | |
| 449,438 A | 3/1891 | Frantz | |
| 538,141 A * | 4/1895 | Wilson et al. | 222/189.07 |
| 1,020,714 A | 3/1912 | Rich et al. | |
| 1,079,964 A | 12/1913 | Vohland | |
| 1,160,535 A | 11/1915 | Selk | |
| 1,167,667 A | 1/1916 | Stoffel | |
| 1,203,094 A | 10/1916 | Bordeau | |
| 1,302,574 A | 5/1919 | Mason | |
| 1,424,933 A | 8/1922 | Owen | |
| 4,889,517 A * | 12/1989 | Strong et al. | 460/66 |
| 4,946,419 A | 8/1990 | Cromheecke et al. | 460/68 |
| 5,035,675 A | 7/1991 | Dunn et al. | 460/62 |
| 5,036,653 A | 8/1991 | Klinner | 56/130 |
| 5,125,871 A * | 6/1992 | Gorden | 460/69 |
| 5,192,245 A * | 3/1993 | Francis et al. | 460/71 |
| 5,192,246 A * | 3/1993 | Francis et al. | 460/72 |

(Continued)

*Primary Examiner*—Thomas B Will
*Assistant Examiner*—Joan D Misa
(74) *Attorney, Agent, or Firm*—Michael G. Harms; John William Stader; Patrick M. Sheldrake

(57) ABSTRACT

A locking system for attaching a threshing and/or separating element to a mounting lug on a rotor of a threshing system of an agricultural combine, including a single bolt attachment with multiple points of contact between the element and the lug created by a convex portion extending from an inner surface of the threshing and/or separating element cooperatively engaged in a recessed portion of the mounting lug. The locking system resists loading conditions generated when the crop mat engages the element, prevents radially outward movement of the threshing and/or separating element relative to the mounting lug, and reduces the stress on the mounting hardware during harvesting operations.

8 Claims, 4 Drawing Sheets

U.S. PATENT DOCUMENTS 6,325,714 B1 * 12/2001 Tanis et al. .................... 460/71
7,022,013 B1 * 4/2006 Van Quekelberghe et al. . 460/66
7,390,252 B1 * 6/2008 Tanis et al. .................... 460/68
2008/0167100 A1 * 7/2008 Farley et al. ................... 460/71
2008/0167101 A1 * 7/2008 Farley et al. ................... 460/72

* cited by examiner

LOCKING SYSTEM FOR ATTACHING A THRESHING AND/OR SEPARATING ELEMENT TO A ROTOR OF A THRESHING SYSTEM

This application claims the benefit of U.S. Provisional Application Nos. 60/878,817 and 60/878,823, both filed Jan. 5, 2007.

TECHNICAL FIELD

This invention relates generally to attachment of a threshing and/or separation element to a rotor for a threshing system of an agricultural combine, and more particularly to a locking system for attaching a threshing/separating element to a mounting lug on the rotor, which locking system resists loading conditions encountered during operation, prevents radially outward movement of the element, and reduces stress on the mounting hardware of the locking system.

BACKGROUND ART

U.S. Provisional Application Nos. 60/878,823 and 60/878,817, both filed Jan. 5, 2007, are incorporated herein in their entirety by reference.

Many agricultural combines use a rotary threshing and/or separating system. The system typically includes at least one rotor drivingly rotated within a rotor housing including a perforated concave spaced radially outwardly thereof. The rotor will often have a frusto-conical inlet end having a helical flight or flights therearound for conveying a flow of crop material into a space between the rotor and the housing. The main body of the rotor will typically have an array or layout of threshing elements, such as rasp bars, and separating elements, such as straight separator bars, and the like, which protrude radially outwardly therefrom into the space for conveying a mat of the crop material along a helical path through the space, while cooperating with the concave to separate larger components of the crop, namely crop residue commonly referred to as straw, which includes stalks, stems, cobs and the like, from the smaller grain and material other than grain (MOG).

The threshing/separating elements are typically attached to the rotor through the use of either hardware or the combination of hardware and a mount welded to the rotor tube. Usually a single bolt fastens each of the rasp bars and separator bars to a respective sheet metal mount welded to the rotor tube. This single bolt attachment method is known for its simplicity and ease of service. As combines have started to utilize smaller diameter rotors within the housing (sometimes referred to as "small tube" technology), the rasp bars and separator bars have become larger and the crop mat is often thicker. It has been noted, however, that operation with a thicker crop mat creates increased loading conditions, namely higher forces on the threshing/separating elements, particularly on straight separator bar type separating elements. The loading conditions generated by the interaction of the thicker crop mat with the outer surface features of the larger threshing/separating elements, create a moment at the bolt attachment to the mounting lug and urge radially outward movement of the leading edge of the elements. In some cases it has become increasingly difficult to maintain a structurally sound assembly wherein the threshing/separating elements can remain fixed to the rotor throughout various operational and crop loading scenarios. Thus, threshing/separating elements mounted to the rotor using the traditional single point attachment have been found to be inadequate in light of the increased loading conditions exerted against the threshing/separating elements, as a result of such loads as are encountered with the smaller diameter rotor constructions.

Accordingly, what is sought is a locking system for attaching a threshing and/or separating element to a rotor of a threshing system of an agricultural combine which overcomes at least one of the problems, shortcomings or disadvantages set forth above.

SUMMARY OF THE INVENTION

What is disclosed is a locking system for attaching a threshing and/or separating element to a rotor of a threshing system of an agricultural combine which overcomes at least one of the problems, shortcomings or disadvantages set forth above.

According to a preferred aspect of the invention threshing elements, such as rasp bars, and/or separating elements, such as straight separator bars, and the like, are attached to mounting lugs affixed on a rotor of a threshing system using the typical single point attachment method and incorporating multiple points of contact between each element and lug to provide additional load bearing capability. The locking system is configured by incorporating a geometry that "locks" the element to the lug through physical interference between the element and the lug. Once the mounting hardware is installed, as a result of the location of the multiple points of contact and the physical interference between the element and the lug, the attachment created is very similar to a dovetail joint and a wedge style lock in strength and longevity. In particular, the multiple points of contact between the mounting lug and threshing and/or separating element are advantageous, as they prevent radially outward movement of the element relative to the mounting lug. The loading conditions, instead of being exerted at the single bolt attachment, are distributed throughout the multiple points of contact, thereby reducing the stress at the bolt and strengthening the attachment of the threshing and/or separating element to the rotor. The threshing and/or separating element is still easily removable from the mounting lug once the hardware is removed by sliding it laterally across the mounting lug, which in essence "unlocks" the element, and releases the contacting points.

According to a preferred embodiment of the invention, the mounting lugs include a concave receptacle oriented to face in the direction of rotation of the rotor, with a lip or detent disposed radially outwardly of the concave receptacle and extending in the direction of rotation therefrom. Threshing and/or separating elements include a radially inwardly extending tab on the front end thereof, which tab is cooperatively received within the concave receptacle of the mounting lug for interlocking the threshing and/or separating element with the mounting lug when mounted thereon. Multiple points of contact between the tab of the element and the concave receptacle of the lug prevent radially outward movement of the forward end of the element relative to the lug, thus maintaining attachment of the threshing and/or separating elements to the rotor.

As a result of the invention, the single bolt attachment method, known for its easy installation, removal, and serviceability is retained. Multiple points of contact and physical interference between the element and mounting lug are incorporated so as to better distribute loading conditions and thereby reduce stress at the single bolt attachment, and a controlled maximum deformation due to normal crop system loading is achieved.

DETAILED DESCRIPTION OF THE INVENTION

Figure 1:
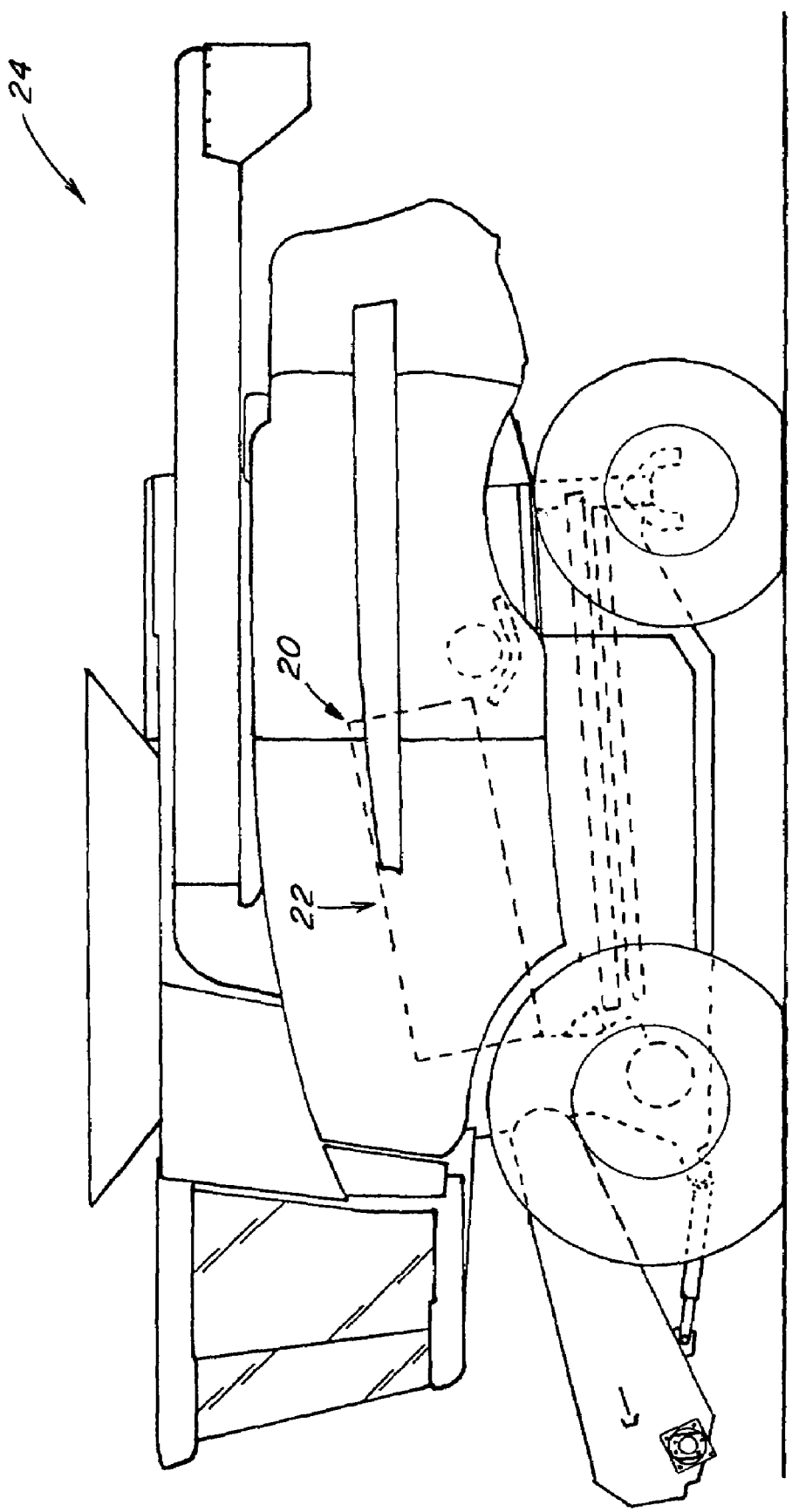
FIG. 1 is a side view of an agricultural combine having a threshing system including a rotor.
Figure 2:
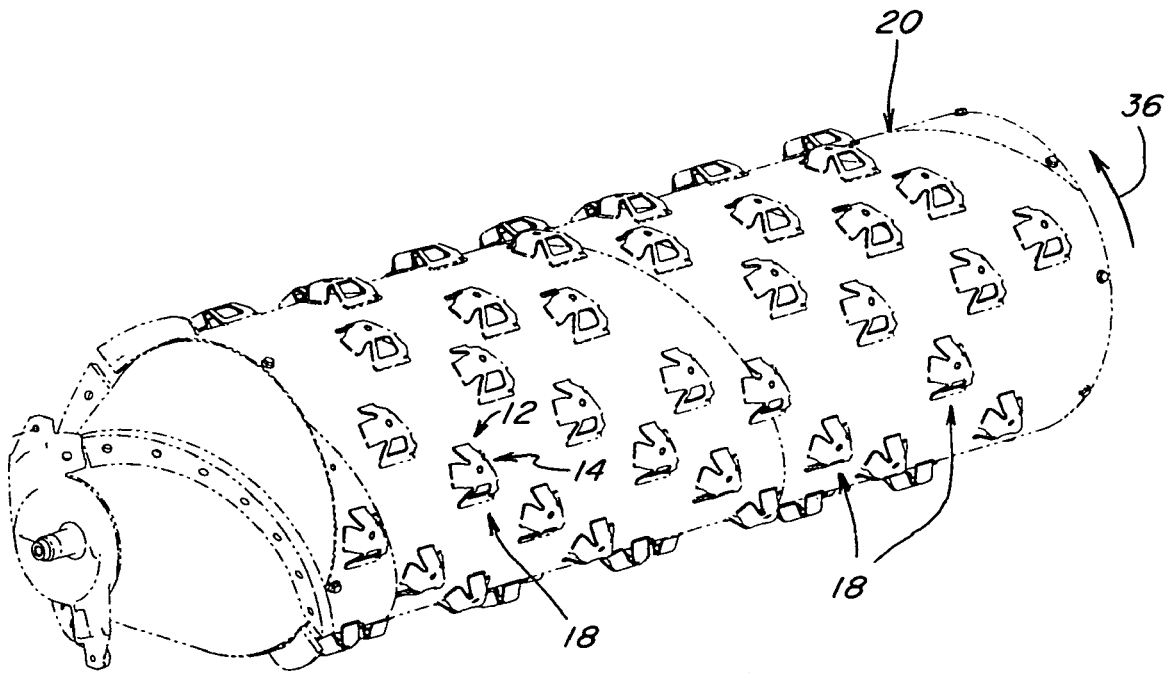
FIG. 2 is a perspective view of a representative rotor showing a helical pattern of mounting lugs welded to the surface of the rotor.

Turning now to the drawings, FIG. 1 depicts a representative agricultural combine 24 including a threshing/separating system 22 having a rotor 20. Agricultural combine 24 is representative of an axial flow type combine including one or two fore and aft extending rotors, but it should be understood that it is contemplated that the invention can likewise be used with rotors of other types of combines, including, but not limited to, conventional types wherein one or more rotors of the invention will be mounted in a transverse orientation within a body of the combine. FIG. 2 shows a typical helical arrangement of representative prior art mounting lugs 18 affixed to rotor 20. Threshing and/or separating elements are attached to mounting lugs 18 using a single bolt attachment, well known for its simplicity and ease of service.

Figure 3:
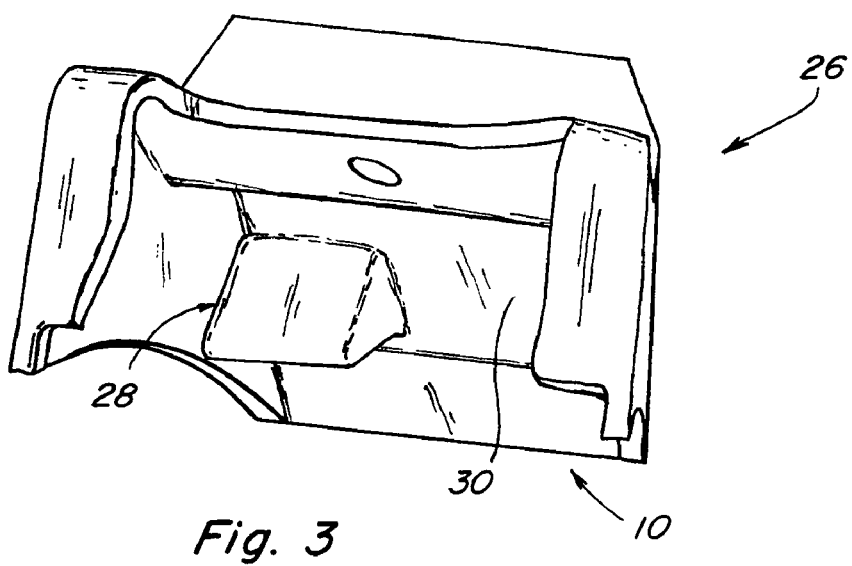
FIG. 3 is a rear perspective view of a straight separator bar according to the present invention.
Figure 4:
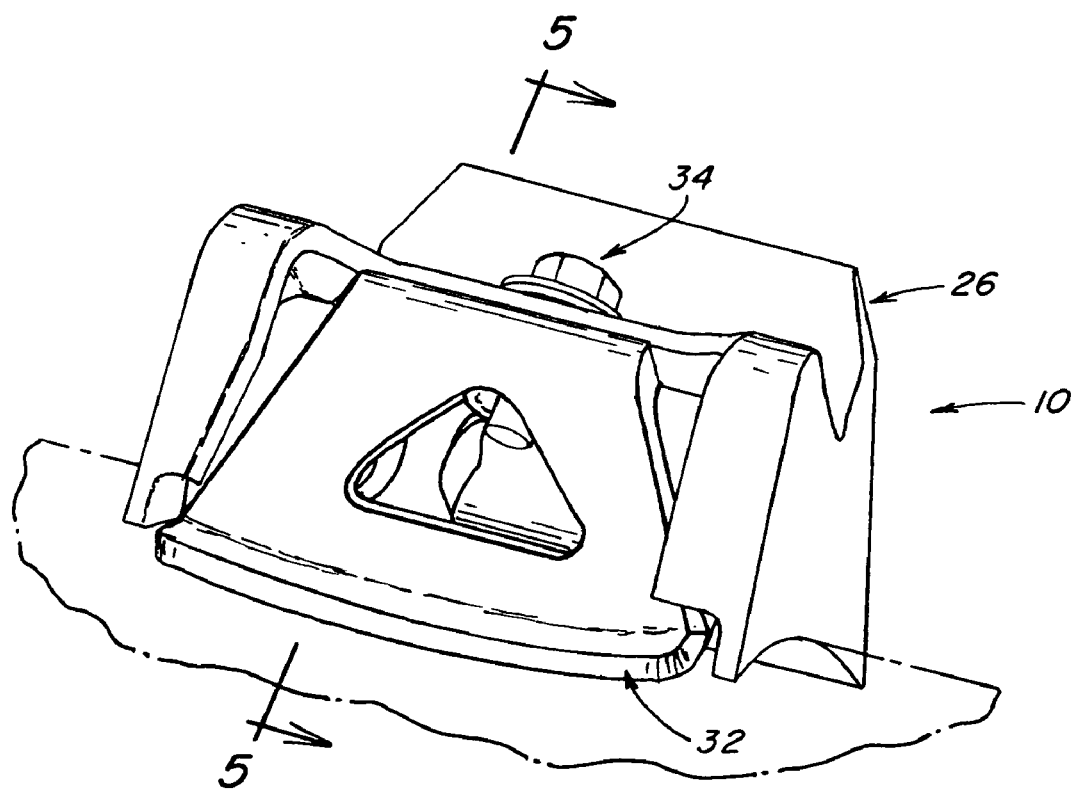
FIG. 4 is a rear perspective view of the straight separator bar of FIG. 3, shown fastened to a mounting lug according to the present invention.

Referring to FIG. 3, wherein aspects of a preferred embodiment of a locking system 10 according to the present invention are shown, a straight separator bar 26 is shown in a rear perspective view. As one feature of the invention, a convex wedge or tab 28 extends radially inwardly from the interior of a front portion 30 of straight separator bar 26. FIG. 4 is a similar rear perspective view showing straight separator bar 26 fastened to mounting lug 32 and attached at a contact point by a bolt 34 according to locking system 10.

Figure 5:
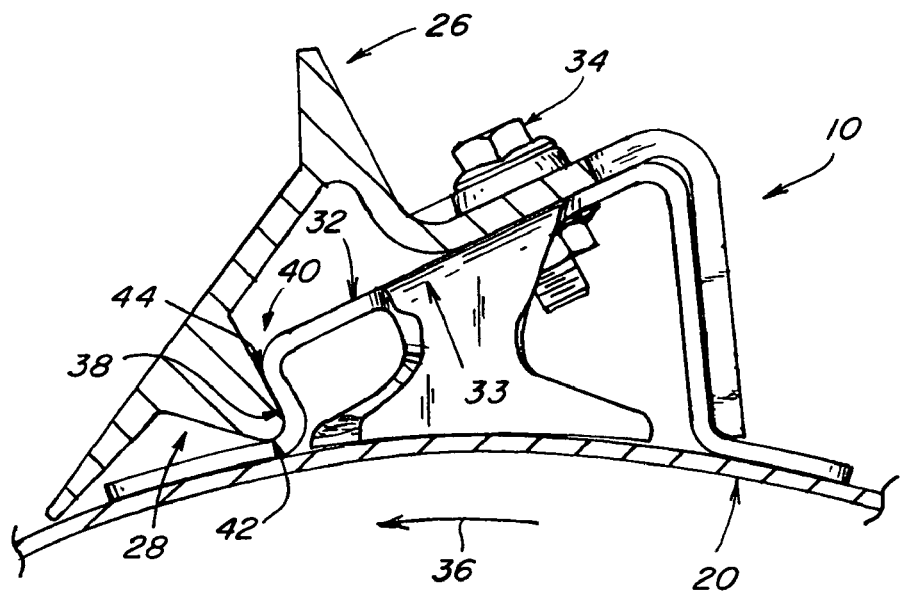
FIG. 5 is a sectional view of the straight separator bar of FIG. 4 taken along line 5-5.
Figure 6:
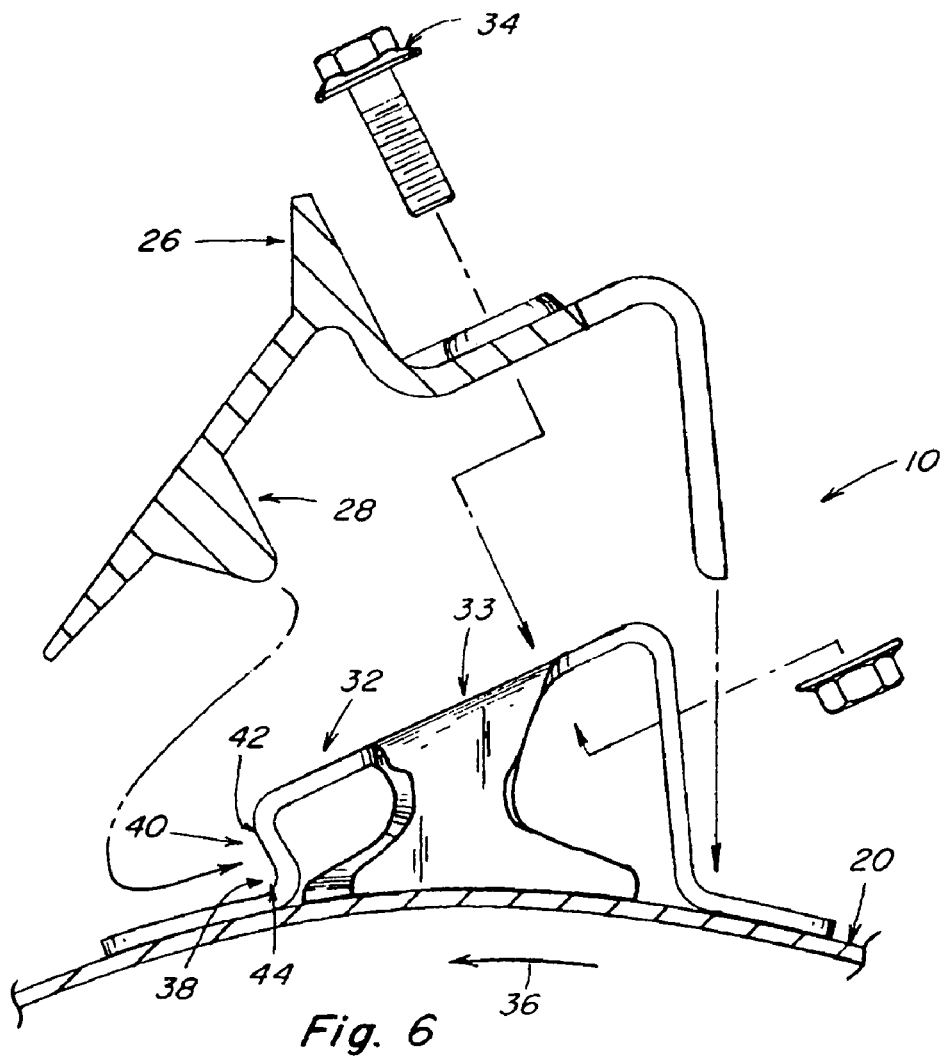
FIG. 6 is an exploded view of the straight separator bar of FIG. 5.

FIGS. 5 and 6 illustrate the relationship between straight separator bar 26 and mounting lug 32 in a sectional view and in an exploded sectional view taken along line 5-5 of FIG. 4. Rotor 20 is supported within combine 24 for rotation in a direction depicted by arrow 36 about a rotational axis therethrough. Mounting lug 32, affixed to rotor 20, includes a concave receptacle 38 facing in direction of rotation 36. Concave receptacle 38 includes a detent in the form of a lip 40 disposed radially outwardly of concave receptacle 38 and extending in direction of rotation 36 therefrom. Concave receptacle 38 is shaped to cooperatively receive tab 28 creating additional contact between mounting lug 32 and straight separator bar 26. Two representative locations of interest along concave receptacle 38 are denoted 42 and 44. As can be seen in FIG. 5, location 42 is radially inward and rearward with respect to direction of rotation 36 when compared to location 44. Conversely, location 44 is radially outward and forward with respect to direction of rotation 36 when compared to location 42. As a result, lip 40 physically interferes with radially outward movement of tab 28 thereby interlocking straight separator bar 26 and mounting lug 32.

As noted above, smaller diameter rotors have given rise to larger threshing elements such as straight separator bar 26. According to one embodiment of the invention, mounting lug 32 is modified to fasten the larger threshing elements to rotor 20. As can be seen in FIG. 2, prior art mounting lug 18 has an inclined leading edge 12 facing in direction of rotation 36, which leading edge 12 extends towards a relatively flat mounting surface 14. Consequently, a mounting bolt (not shown) fastening a threshing element to prior art mounting lug 18 is situated generally perpendicular to the surface of rotor 20 immediately beneath the lug. In contrast, FIGS. 5 and 6 show mounting lug 32 including concave receptacle 38 and inclined mounting surface 33 extending therefrom. Mounting bolt 34 fastening separator bar 26 is therefore preferably situated generally perpendicular to mounting surface 33 rather than rotor 20.

Figure 7:
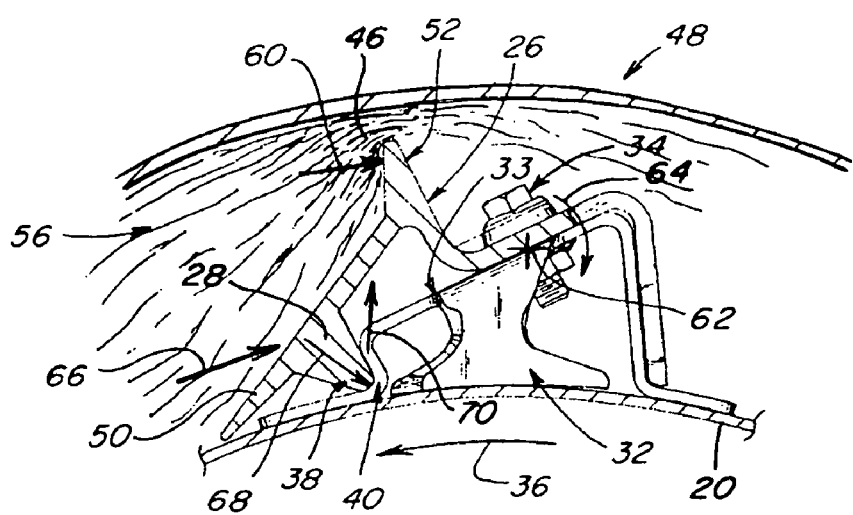
FIG. 7 is a sectional view of the straight separator bar of FIG. 4 in an operational scenario, showing loading conditions exerted by a crop mat on the straight separator bar of the invention.

FIG. 7 illustrates a threshing or separating operation, and the loading conditions exerted on or near straight separator bar 26, mounting lug 32 and bolt 34. As a mat of crop material 56 is conveyed along a helical path through a gap or space 46 between rotor 20 and a concave 48, crop mat 56 engages a leading edge 50 of straight separator bar 26 and is therefore compacted against an opposing surface of concave 48 as space 46 narrows near an agitation element 52. As a result, concave 48 and straight separator bar 26 cooperate to separate smaller elements of the crop material, including grain, from larger elements, namely stalks, cobs, leaves and the like, and urge the smaller elements outwardly through apertures in concave 48. The smaller elements, including the grain, then fall through concave 48 to a cleaning system (not shown) of combine 24 for further processing. The straw and other larger elements continue to be conveyed through space 46, and are propelled rearwardly from the threshing/separating 22 system for disposal.

Loading conditions generated by interaction of separator bar 26 with crop mat 56 in the above-explained manner, will include a range or variety of forces exerted against straight separator bar 26, essentially distributed over the entire surface face thereof facing in direction of rotation 36. These forces are summarized in FIG. 7 as a force 60 exerted against agitation element 52, and a force 66 exerted against the body of separator bar 26, both forces being oriented in the direction opposite direction of rotation 36. As a result mainly of force 66, tab 28 is urged into concave receptacle 38, as generally denoted by arrow 68. And, as a result of the distance of agitation element 52 from the surface of rotor 20, force 60 will act to urge separator bar 26, and particularly leading edge 50 and tab 28, radially outwardly (upwardly in FIG. 7), as generally denoted by arrow 70. Importantly, any radially outward movement of separator bar 26 is prevented by the points of contact between bar 26 and lip 40, such that tab 28 is essentially forced and locked against lip 40 by force 70. Thus, lip 40 provides physical interference preventing any radially outward movement of separator bar 26. Lip 40 additionally provides physical interference preventing any movement of separator bar 26 in the direction opposite direction of rotation 36, that is, any rearward movement relative to direction 36. This serves to reduce loading conditions exerted against bolt 34. That is, any forces exerted against bolt 34 at its interface with lug 32, denoted generally at point 62, such as shear forces, and moments, as denoted by arrow 64, are reduced. Still further, as a result of inclined mounting surface 33, forces that are exerted against bolt 34 will be at least partially compressive, as opposed to totally shear forces.

While the invention has been illustrated herein with reference to straight separator bars, it should be understood that it is contemplated that the locking system of the invention can likewise be used with any threshing and/or separating elements, including rasp bars, straight separator bars and the like. Accordingly, locking system 10 of the present invention preserves the traditional single bolt attachment known for its simplicity and serviceability, and overcomes the undesirable stress at the single bolt attachment by providing physical interference at additional points of contact between the threshing and/or separating element and mounting lug.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A motor of a threshing system of an agricultural combine, comprising:
    a body supported for rotation in a direction of rotation about a rotational axis therethrough, the body having an outer circumferential surface;
    a plurality of mounting lugs arranged on the circumferential surface in a predetermined pattern; each of the mounting lugs having a leading end and a trailing end wherein the leading end is S-shaped when viewed from a cross-sectional view taken along a distance between the leading and trailing ends, the S-shaped leading end is formed from first and second bends, wherein the first bend is radially outward and forward of the second bend and the second bend is radially inward and rearward of the first bend such that the second bend forms a concave receptacle facing in the direction of rotation, and each of the mounting lugs have a radial outer surface with a hole adapted for a mounting attachment; and
    a plurality of threshing elements, each of the threshing elements including a forward end facing in the direction of rotation and a radial inner surface mounted to the radial outer surface of one of the mounting lugs; the radial inner surface of the forward end of the threshing element including a tab extending radially inwardly and cooperatively received within the concave receptacle of the mounting lug, interlocking the threshing element with the mounting lug to prevent radially outward movement of the forward end of the threshing element relative to the mounting lug.

2. The rotor of claim 1, wherein the mounting lugs are arranged in a spaced apart generally helical pattern.

3. The rotor of claim 1, wherein the threshing elements include rasp bars and separator bars.

4. The rotor of claim 1, wherein the threshing element is interlocked with the mounting lug when mounted thereon.

5. A locking system for a threshing element and a mounting lug of a rotor of a threshing system of an agricultural combine, comprising a threshing element including a sloped leading portion extending from a first end towards a second end, a trailing portion configured to accept a bolt for attachment to a mounting lug, and an agitation element situated between the second end and the trailing portion; the sloped leading portion including a convex portion extending from an inner surface of the threshing element and rearwardly relative to the leading portion, the convex portion sized and shaped to cooperatively engage a concave recess of an S-shaped leading end of the mounting lug in a locking engagement when the threshing element is in overlaying relation thereto; wherein the S-shaped leading end is formed by a first and second bend wherein the first bend is radially outward and forward of the second bend with respect to the leading end and wherein the second bend is radially inward and rearward of the first bend with respect to the leading end, further wherein the second bend forms the concave recess; wherein the locking engagement will create contact locations between the threshing element and the mounting lug, the contact locations disposed to prevent separation of the threshing element and the mounting lug urged by loading conditions exerted by crop material when the threshing element is mounted on the rotor to engage crop material at the first end of the leading portion and guide the crop material to the agitation element when the rotor is rotating about a rotational axis.

6. The locking engagement of claim 5, wherein the agitation element of the threshing element is a straight separator bar.

7. The locking engagement of claim 5, wherein the agitation element of the threshing element is a rasp bar.

8. The locking engagement of claim 5, wherein the agitation element is integral to the threshing element and the agitation element extends substantially perpendicular from the sloped leading portion.

* * * * *

UNITED STATES PATENT AND TRADEMARK OFFICE
CERTIFICATE OF CORRECTION

PATENT NO.        : 7,632,182 B2                                         Page 1 of 1
APPLICATION NO.   : 12/001102
DATED             : December 15, 2009
INVENTOR(S)       : Herbert M. Farley et al.

It is certified that error appears in the above-identified patent and that said Letters Patent is hereby corrected as shown below:

Claim 1, Col. 5, Line 26, "motor" should be -- rotor --.

Signed and Sealed this

Sixth Day of July, 2010

David J. Kappos
*Director of the United States Patent and Trademark Office*